No. 845,995. PATENTED MAR. 5, 1907.
A. O. BENECKE.
ELECTRICAL MEASURING INSTRUMENT.
APPLICATION FILED NOV. 28, 1905.

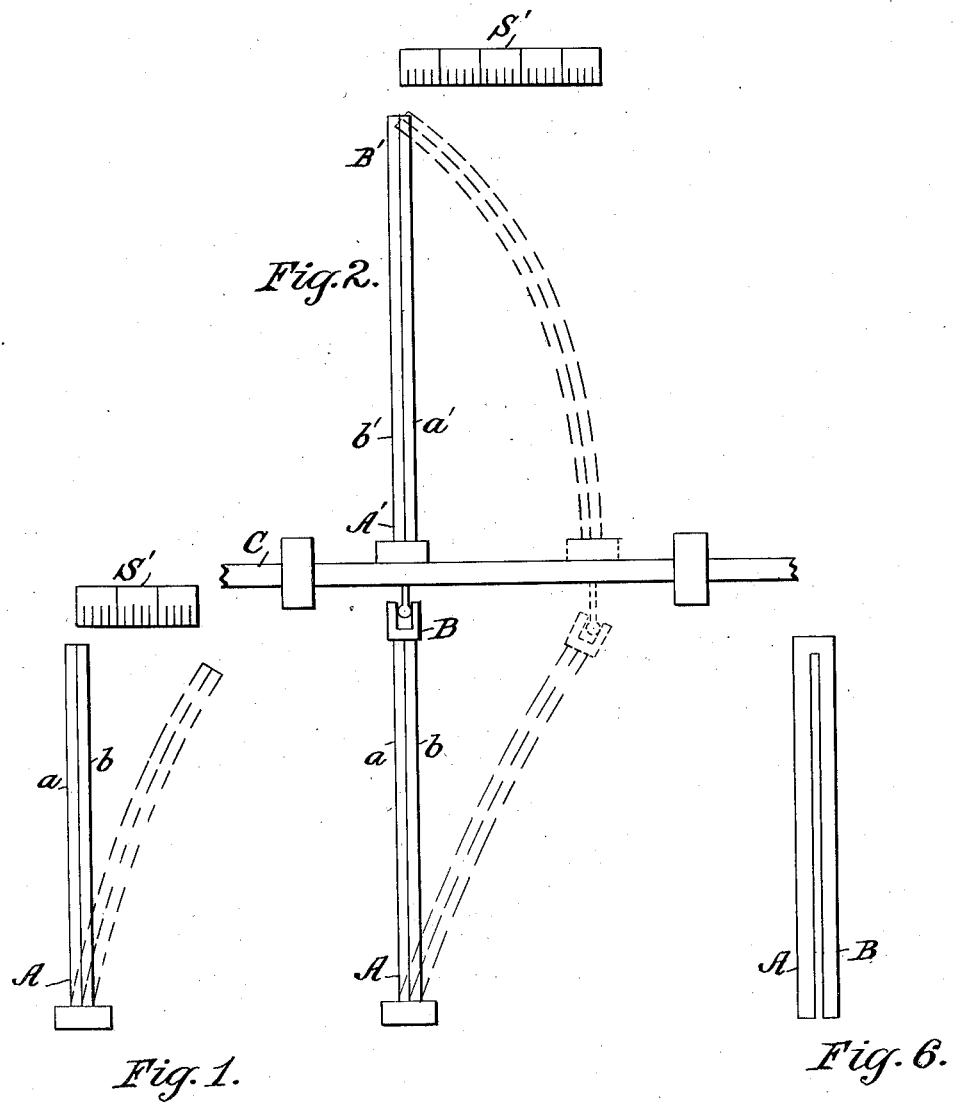

3 SHEETS—SHEET 3.

WITNESSES:

INVENTOR.
Adelbert O. Benecke
BY Fischer & Sanders.
ATTORNEYS

UNITED STATES PATENT OFFICE.

ADELBERT O. BENECKE, OF NEWARK, NEW JERSEY, ASSIGNOR TO AMERICAN INSTRUMENT COMPANY, A CORPORATION OF NEW JERSEY.

ELECTRICAL MEASURING INSTRUMENT.

No. 845,995.  Specification of Letters Patent.  Patented March 5, 1907.

Application filed November 28, 1905. Serial No. 289,406.

*To all whom it may concern:*

Be it known that I, ADELBERT O. BENECKE, of Newark, Essex county, New Jersey, have invented a new and useful Improvement in Electrical Measuring Instruments, of which the following is a specification.

My invention relates to an electrical measuring instrument which is equally adapted for the measurement of direct currents as for the measurement of alternating currents of any frequency and wave form, whose indications are neither affected by temperature changes, external magnetic fields, nor the induction effects of alternating currents, and which can be used either as voltmeter or as ampere-meter.

Figure 7:
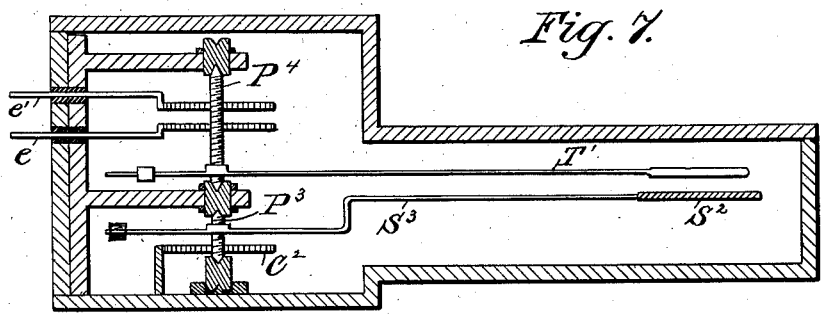
Figure 8:
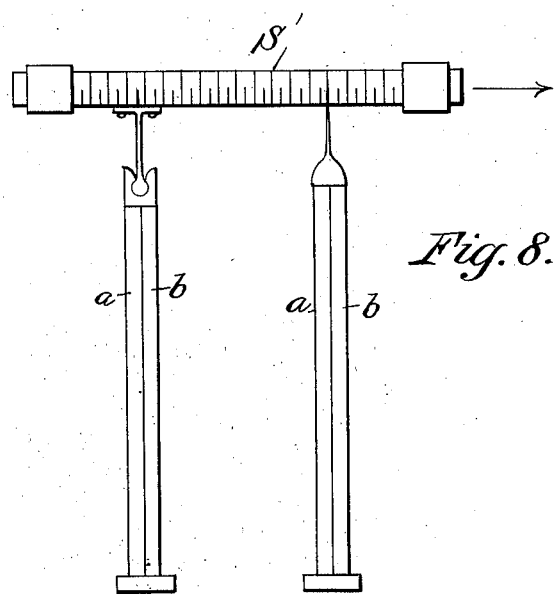

Figures 1, 2, and 8 illustrate the principle on which my invention is based, and Figs. 3, 4, 5, and 7 are illustrations of such constructions of the instrument as appear practical. Fig. 6 is a diagrammatic detail.

Similar letters of reference indicate like parts.

It is a well-known fact that when two long strips of different material having different coefficients of expansion are rigidly connected together lengthwise the body so formed will be bent under the influence of any change in the temperature. In Fig. 1, A is such a body consisting of two strips $a$ and $b$, for example, of silver and platinum. If one end of this body is fixed, the other end will move to the dotted-line position if the temperature of the body is increased, because the coefficient of expansion of silver is larger than that of platinum. The dotted-line position depends upon the temperature of the body A and when read on a calibrated scale S can serve as a measure of that temperature. If the body A is an electrical conductor and an electrical current is sent through the same, the instrument will serve to measure the strength of this current, as the heating effect of an electric current depends upon its strength. The indications of such an electrical measuring instrument would, however, be affected by any change in the atmospheric temperature.

In Fig. 2 the same body A, composed of the two strips $a$ and $b$ of silver and platinum, respectively, is shown. The motion of its free end B under the influence of temperature changes is transmitted by a simple translating device $c$ to the end A' of a similar body A' B', which consists also of a silver strip $a'$ and a platinum strip $b'$; but while the silver strip $a$ forms the left half of the body A B it forms the right half of the body A' B'. If both bodies are alike and subjected to the same temperature changes, it is evident that the point B' will remain stationary on the scale S'. If one of the bodies—for example, A B—is heated by the passage of an electric current through the same, the position of B' on the scale S' will be a measure for the strength of the current and will be independent from any change in the surrounding temperature. For the construction of electrical instruments I prefer to employ the bodies A and A' in the form of flat spirals, which coil up or uncoil under the influence of the temperature changes. The body A B, through which the current to be measured is sent, I prefer to divide into two parts of smaller width, Fig. 6, which allows the leading in and out of the current without any additional flexible conductors.

Figs. 3, 4, 5, and 7 illustrate four different modifications of the instrument. Each of the flat spirals A', B', and C' is composed of two flat strips of different materials having a different coefficient of expansion. Two cylindrical shafts P' P² are pivoted in such manner that their axis of rotation form a straight line. One end of each of the spirals A' B' is rigidly fixed to the frame F of the instrument through the conductors $e$ $e'$, insulated from each other and from the frame by means of the insulators $i$ $i$. Here the current connection is made to the spirals A' B', which are electrically connected at their other ends and attached to the shaft P'. One end of spiral C' is also either directly or by means of an abutment D connected to the shaft P', whereas its other end is connected to the shaft P², which also carries the pointer or index T of the instrument. The three spirals are wound in such a manner that in case only the spirals A' B' are heated they would turn the shaft P', and therefore, also, the shaft P² and the index T, in the direction of the hands of a clock, and in case only the spiral C' is heated it would turn the shaft P² and the index T in a direction opposite to the hands of a clock. The dimensions of the three spirals are so proportioned that if subjected to the same temperature change they counteract and balance each other, so that the index T will not change its position in reference to the scale S', which is rigidly connected to the frame F. At the points J, I provide jewel-bearings, as of sapphire, for the pivot ends of the shafts P' P², as shown. These being of insulating material serve the additional purpose of preventing any current leakage or possible short-circuiting of the current. It is to be understood that the working parts are to be inclosed in a suitable case, as E, having the glass-covered opening E' over the scale S' and the index T. Where the radiated heat due to an electric current passing through the spiral A' B' is likely to affect the spiral C', I may mount upon the shaft P' a disk G of any nonconductor of heat, as a disk of mica or of hard rubber.

Figure 3:
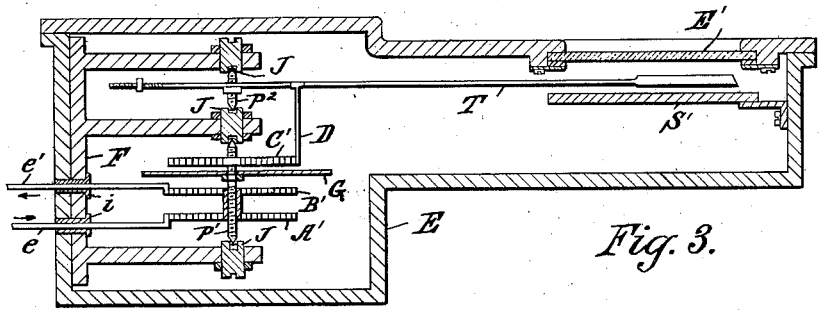
Figure 4:
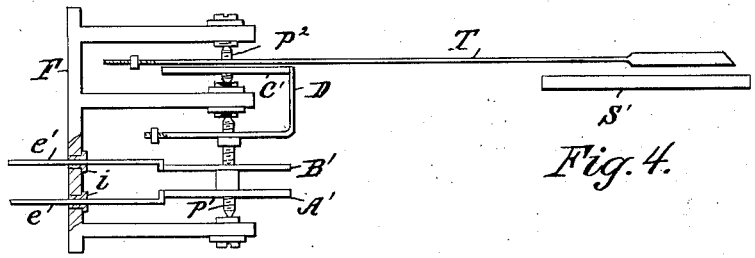
Figure 5:
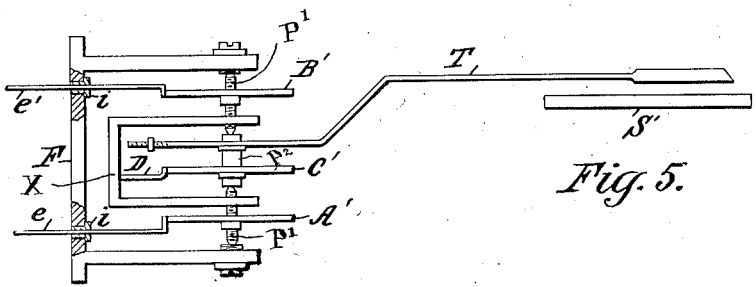

The modifications illustrated in Figs. 3, 4, 5, and 7 differ from that illustrated in Fig. 2 only in the specific arrangement of the spirals and the location of the index T. In Fig. 5 the shaft P' is divided and the two sections are rigidly connected together by means of the U-shaped frame X, while the shaft P² is mounted in the open part of the frame X in alinement with the shaft-sections P'. In this case the spiral C' is connected to the frame X by means of the abutment D. The spirals may be composed of any material whatever so long as they possess the requisite difference in their coefficients of expansion and so long as one of said spirals possesses the requisite electrical conductivity, and I do not for this reason confine myself to the use of metallic substances. I find hard rubber and ivory to work admirably well; but because of ease of manipulation I prefer to use two metals from which to construct the spirals. If now the instrument is connected up in an electrical circuit, the current passing into the instrument will traverse the conductor e, the spirals A' B', and out by the way of the conductor e', and thus generate a temperature in the spirals the degree of which is a function of the current strength or potential in accordance with the quality of the instrument as an ammeter or voltmeter, and thereby cause said spirals to coil up or uncoil as the metal of larger expansion is outside or inside. This uncoiling tendency is transmitted through the shaft P' to the spiral C' and thence to the index-pointer T, by which the voltage or amperage is indicated upon the calibrated scale S'.

The principle of my invention may be carried out by causing the electrical current to pass through the strips which are connected with or carry the index, while the scale is connected with or carried by the temperature-strip, as diagrammatically shown in Fig. 8. Changes in atmospheric temperature act equally upon both sets of strips $a$ $b$, so that when properly adjusted the index will always register at "0." When an electric current is directed through the strips connected with the index T', the heat generated thereby will be added to the normal temperature of these index-strips, and therefore the index will indicate the proper degree of deflection upon the scale.

In Fig. 7 is illustrated in concrete form the embodiment of this principle of operation. The conductor-wires $e$ $e'$ lead in to the spiral strips, as heretofore described, upon the shaft P⁴, which shaft also carries the counterbalanced index T'. In alinement with the shaft P⁴, I mount the shaft P³ in jeweled bearings, and upon this shaft I secure the spiral bimetallic strip C², the exterior end of this spiral strip being secured in any convenient manner to the frame of the machine. Upon the shaft P³, I secure the counterbalanced scale-support S³, said scale-support carrying at its outer end the graduated scale S². It should be here noted that the spiral strips B' and C' are oppositely coiled in Figs. 3, 4, and 5 and that the corresponding spiral strips in Fig. 7 are coiled in the same direction. The reason for this arrangement is clearly shown in the diagrammatic Figs. 2 and 8. Inasmuch as the spiral strips are all of the same character and condition, changes in atmospheric temperature will affect them equally, and when properly adjusted the index T' will always point to "0." Changes in the temperature of the spiral strips connected with the conductors $e$ $e'$, due to the passing of the electrical current therethrough, affect only the index T'; but inasmuch as both sets of spiral strips are affected by the atmospheric temperature in common the resultant difference in deflection is due solely to the effect of the electrical current.

The principle of the operation of this last-described structure is the same as that involved in the structures illustrated in Figs. 3, 4, and 5.

It is evident that an instrument constructed as described in this specification has all the advantages of the so-called "hot-wire instruments" and that its indications will be the same when used on alternating currents of any frequency and wave form as on direct currents; that they are free from disturbances due to external fields or inductive effects of alternating currents. The indications are furthermore not altered by changes in the surrounding temperature, and the heated body is perfectly free and not under stress, as is the case in all hot-wire instruments. The fact that the heated body in the hot-wire instruments is in the form of a thin and fragile wire which is always kept taut by the action of a spring has the effect that this fine wire is constantly stretched, which of course must alter the constant or calibration of the instrument. This disadvantage is entirely overcome by my invention, inasmuch as the set of spirals A' B' are placed in tandem relation to carry the current, while the spiral C' is free from any current influence and is affected only by changes in surrounding temperature, being thus free to counteract the same temperature changes which affect the spirals A' B'.

I claim—

1. In an electrical measuring instrument, the combination of two shafts in alinement, a spiral strip composed of two metals having different coefficients of expansion, secured to each of said shafts, means for passing an electrical current through one of said spirals to cause the same to be deflected and thereby rotate said shaft, means for transmitting such motion to the other shaft through the spiral strip secured thereto, and means for measuring the degree of such rotation.

2. In an electrical measuring instrument, the combination of a frame, a shaft mounted in said frame, a pair of spirals secured to said shaft, said spirals being composed of two different metals having different coefficients of expansion, means for passing an electric current through said spirals and thereby produce a change in temperature therein and a consequent rotation of said shaft, a second shaft in alinement with the first-named shaft, means for measuring the degree of such rotation, and means mounted upon said second shaft for counteracting such changes of temperature in said spirals as are due to the surrounding atmosphere.

3. In an electrical measuring instrument, the combination of a frame provided with two shafts in alinement, an index secured to one of said shafts, spirals composed of different metals having different coefficients of expansion, said spirals being coiled in opposite directions around said shafts respectively, whereby changes in surrounding temperature will cause the deflection of one spiral to compensate for the deflection of the other, and means for directing an electric current through one of said spirals, to cause a relative change of temperature therein, and thereby produce a relative deflection of the other spiral, and means for measuring the degree of such deflection.

This specification signed and witnessed this 20th day of November, 1905.

ADELBERT O. BENECKE.

Witnesses:
FREDK. C. FISCHER,
C. A. ALLISTON.